Dec. 25, 1962 W. A. CARRINGTON ETAL 3,069,911
CONTROLLED DRIVE MECHANISM
Filed May 4, 1959 4 Sheets-Sheet 1

INVENTORS
WILBUR A. CARRINGTON
ALAN VAN BRONKHORST
BY
Ernest L. Brown
ATTORNEY

Dec. 25, 1962 W. A. CARRINGTON ETAL 3,069,911
CONTROLLED DRIVE MECHANISM
Filed May 4, 1959 4 Sheets-Sheet 2

INVENTORS
WILBUR A. CARRINGTON
ALAN VAN BRONKHORST
BY
Ernest L. Brown
ATTORNEY

INVENTORS
WILBUR A. CARRINGTON
ALAN VAN BRONKHORST
BY
Ernest L. Brown
ATTORNEY

INVENTORS
WILBUR A. CARRINGTON
ALAN VAN BRONKHORST
BY
*Ernest L. Brown*
ATTORNEY 3,069,911
CONTROLLED DRIVE MECHANISM
Wilbur A. Carrington, Grand Rapids, and Alan Van Bronkhorst, Jenison, Mich., assignors, by mesne assignments, to Lear Siegler, Inc., Santa Monica, Calif., a corporation of Delaware
Filed May 4, 1959, Ser. No. 810,907
7 Claims. (Cl. 74—5.2)

This invention pertains to a controlled drive mechanism, and more particularly to a controlled drive mechanism which is adapted to store and deliver energy to an output shaft.

In the inertial navigation art, it is customary to support stabilized reference systems by means of a gimbal support. When stabilized platforms are supported by gimballed supports, the gimbals are usually servoed to maintain some desired angular relation between them. The drive means of the servo system is usually an electrical motor, although occasionally it may be a pneumatic actuator or a hydraulic actuator. Whether the actuator which causes the gimbals to move is electrical, pneumatic or hydraulic, a flow of power to the actuator is necessary in order to move the gimbals against their own inertia, friction, and the like. Usually, the power requirements for causing the gimbals to rotate in their bearings is a modest one. However, upon occasion, it is necessary to supply quantities of power which may be of the order of 10, 20 or 100 times the average power requirement.

When an earth-level or space fixed reference system is supported by a gimbal system in an aircraft, it is necessary to provide a gimbal system which will not lock under any attitude of the aircraft. To prevent gimbal lock, a convenient device that is frequently used is a fourth or redundant gimbal. It is readily evident that for a three degree of freedom system, only three gimbals are ordinarily required. However, when the axes of two of the gimbals are aligned, gimbal lock occurs because the number of degrees of freedom of the gimbal system has been reduced to two. It is customary, therefore, to supply a fourth or redundant gimbal so that the reference system continuously has at least three degrees of angular freedom.

In order to cause the redundant gimbal to follow a predetermined alignment relative to the remaining gimbals, it is usual to servo the redundant gimbal. When the redundant gimbal follows a predetermined alignment relative to the remaining gimbals, under certain conditions it is necessary to slew the redundant gimbal through an angle of 180° in a very short period of time, for example, a quarter of a second. To fast-slew a redundant gimbal which has a high moment of inertia requires a large impulse of torque.

This invention contemplates the use of a mechanical energy storing device such as (for example) a flywheel, to supply energy to the redundant gimbal to slew it 180° in a very short time without requiring a large impulse of torque from the electric, pneumatic or hydraulic system. A flywheel or a rotating shaft is brought up to speed (for example) by means of an electric, pneumatic or hydraulic motor. A pair of counter-rotating slip clutches is connected between the flywheel or high inertia shaft and the gimbal to be slewed. The slip clutches are adapted to be selectively energized to transmit the required amount of torque in the required sense from the flywheel to the servoed gimbal.

It is not to be construed that the device of this invention is limited in application to the servoing of a gimbal system. For example, the device of this invention could be utilized very nicely to position an anti-aircraft gun, or the like. Consider an anti-aircraft gun which must slowly follow a target and then suddenly change from one target to another in a fast maneuver. If such a gun were electrically, hydraulically or pneumatically driven, a large surge of power would be required from the source when the gun was rapidly slewed at a high angular rate unless the mechanical storage device of this invention together with its associated slip clutches were connected to drive such a gun mount.

Further, it is to be noted that in its broadest sense the servo of this invention is adapted to turn a shaft which is connected to any kind of load whatsoever. The possible loads which may be driven by the device of this invention are too numerous to specifically mention.

It is, then, an object of this invention to provide a novel servo system.

It is another object of this invention to provide mechanical energy storing means adapted and connected to rotate a shaft.

It is still another object of this invention to provide means for slewing a gimbal.

It is yet another object of this invention to provide flywheel means, slip clutch connected to a shaft, to cause said shaft to rotate upon its bearings.

Still another object of this invention may be envisioned as providing a machine, including a pair of electro-magnetic slip clutches connected between a mechanical energy storing device and a gimbal to cause said gimbal to selectively rotate in a predetermined direction by applying a predetermined amount and sense of torque to said gimbal.

Other objects will become apparent from the following description when taken in connection with the accompanying drawings in which.

Figure 1:
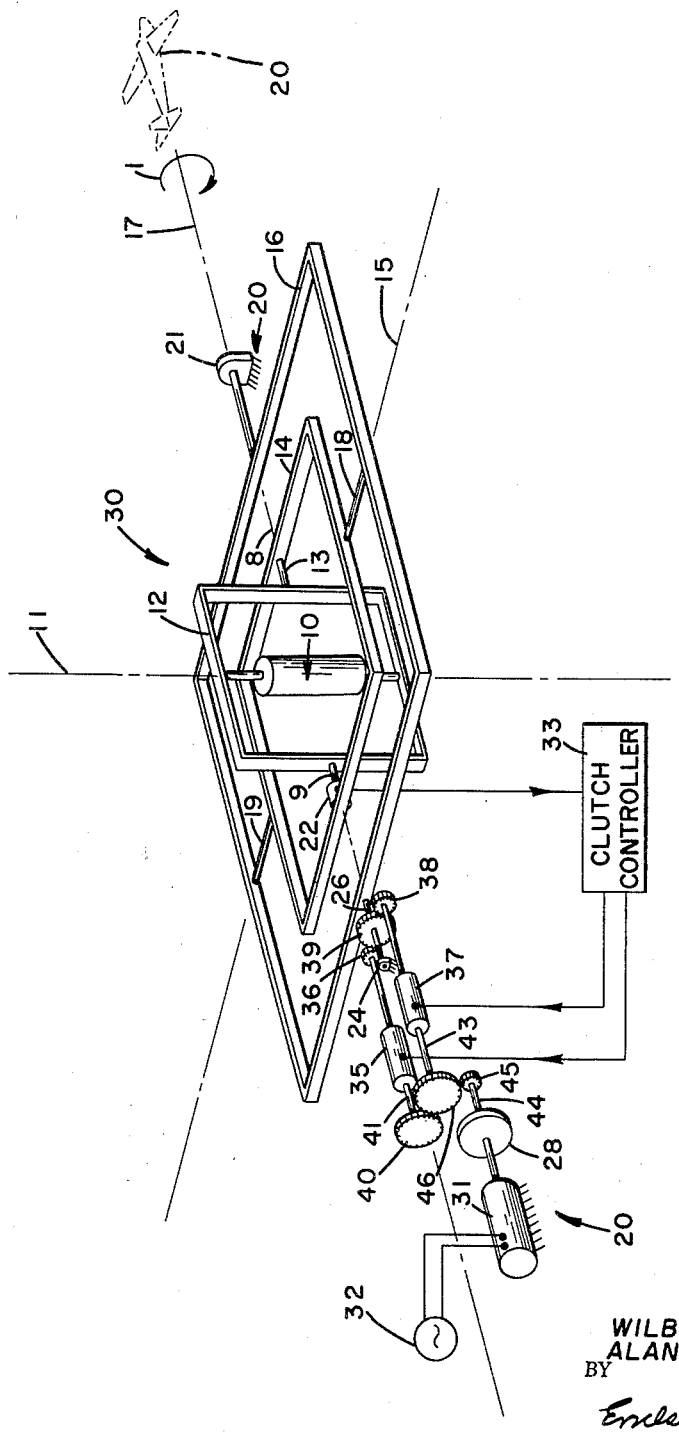
FIG. 1 shows a typical device of this invention connected to the redundant gimbal of a typical inertial reference device with the supporting structure earth-level.

In the figures, a typical inertial reference device 10 (such as, for example, a vertical gyroscope or a gyroscopically stabilized platform) is stably supported relative to a supporting frame or vehicle (such as an airframe) by means of a gimbal system 30. The supporting frame or vehicle 20 is shown symbolically by the ground marks.

In the explanation of a typical use of the device of this invention, it is assumed that the supporting frame or vehicle is an airframe which has a roll axis 17, a pitch axis 15, and an azimuth axis normal to axes 15 and 17.

Inertial reference device 10 is stabilized to remain angularly fixed relative to the locally horizontal plane of the earth. Inertial reference device 10 also has three axes, viz., a roll axis 8, pitch axis 15, and an azimuth axis 11.

Inertial reference device 10 is mounted for freedom of rotation about azimuth axis 11 upon bearings (not shown) which are attached to gimbal 12. Gimbal 12, in turn, is mounted for rotation about axis 8 (normal to axis 11) relative to gimbal 14 upon shafts 9 and 13 and upon bearings (not shown). Gimbal 14 is mounted for rotation about pitch axis 15 relative to gimbal 16 upon shafts 18 and 19 and upon bearings (not shown). Gimbal 16 is mounted for rotation about axis 17 relative to the supporting vehicle 20 upon bearings 21 and 24. Axis 17 is the roll axis of the supporting vehicle and is normal to pitch axis 15.

Inertial element 10 is de-coupled from supporting vehicle 20 through gimbal system 30 by means of the usual system of angle detectors or pickoffs and torque motors (not shown).

In order to avoid gimbal lock, it is frequently desirable to drive a fourth or redundant gimbal, such as, for example, gimbal 16 so that not more than two gimbal axes ever coincide to leave at least three degrees of angular freedom.

In order to better understand the gimbal lock problem, suppose (for example) that shafts 18 and 19 were connected directly to airframe 20. When the supporting aircraft rolled about axis 17, gimbal 14 would start to turn relative to gimbal 12 about axis 17 upon shafts 13 and 9. If the aircraft 20 continued to roll about axis 17 until shafts 18 and 19 were aligned with axis 11, the number of degrees of freedom of inertial system 10 would be reduced to two degrees and gimbal lock would occur.

An extra or redundant gimbal is supplied at 16 and is servoed to cause gimbal 14 to remain normal to gimbal 12 by the action of the controlled drive mechanism of this invention.

An electrical pickoff 22 is connected between the gimbals 12 and 14 to generate a signal with the proper sense and amplitude to provide a measure of the deviation from a right angle of the angle between gimbal 14 and gimbal 12. Pickoff 22 may be (for example) a synchro which generates no signal when gimbals 12 and 14 are normal to each other and which generates a signal whose amplitude is a function of the magnitude of deviation of said angle from a right angle and whose phase depends upon the sense of said deviation.

To supply a torque in a controlled manner and sense to shaft 26, flywheel 28 is brought up to speed by means of a prime mover, such as (for example) electric motor 31 driven by electrical energy source 32. Alternatively, flywheel 28 may be brought up to speed and adapted to receive its energy from a mechanical or hydraulic actuator (not shown). The device contemplated by this invention then utilizes an energy storing device 28 to supply torque to shaft 26. It is to be noted that mechanical energy storing device 28 under some circumstances may not actually be a separate mechanical element, but that the moment of inertia of the motor shaft or other rotating mechanical element of the servo system may be utilized for this purpose. It is then intended that when the word "flywheel" is used herein, that flywheel means a rotating member, having a relatively large moment of inertia, which is thereby adapted to store mechanical energy.

In the detailed mechanical connection of a typical device of this invention (shown more particularly in FIG. 1), flywheel 28 is geared or otherwise mechanically connected to cause input shafts 41 and 43 to turn in counter-rotating directions. Shafts 41 and 43 are caused to counter-rotate by means of shaft 44, gear 45, and by a pair of counter-rotating gears 40 and 46 which engage gear 45 and which are connected to drive shafts 41 and 43, respectively. The input shafts of clutches 35 and 37 then continuously rotate in opposite directions.

Figure 5:
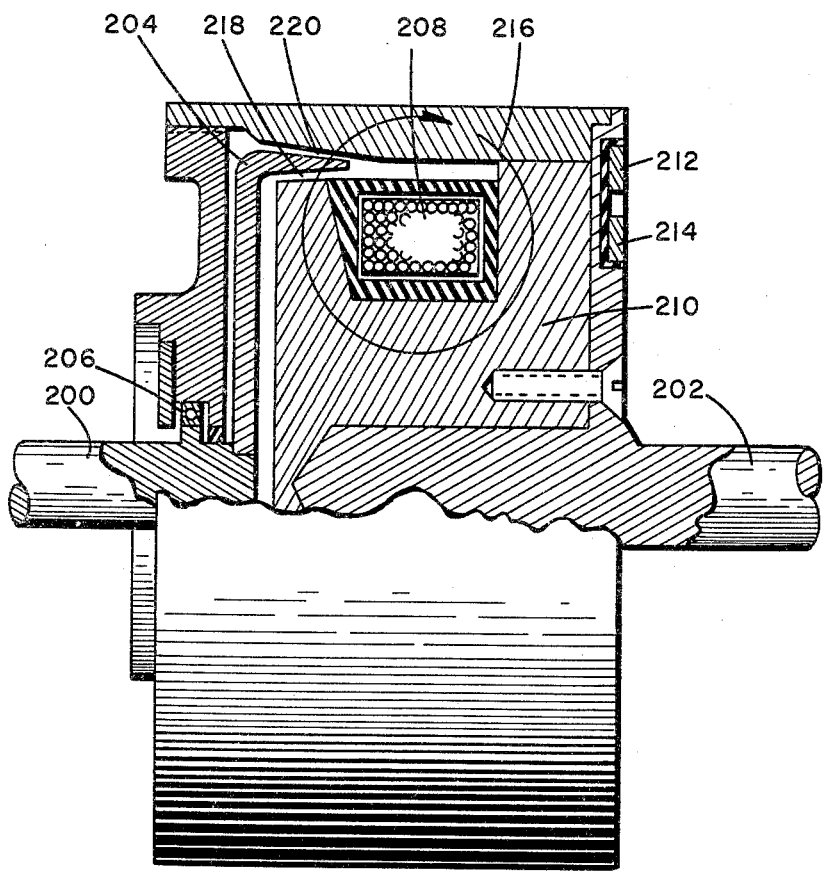
FIG. 5 is a side view, partially in section, of a magnetic particle slip-clutch which may be utilized in the device of this invention.

Clutches 35 and 37 are preferably of the magnetic particle slip clutch variety, an example of which is shown in FIG. 5.

Alternatively, other kinds of mechanical clutches adapted to this particular servo system may be utilized.

When clutch 35 is energized, the output shaft thereof rotates gear 36 in a first direction, and when clutch 37 is energized, the output shaft thereof rotates gear 38 in a second direction opposite to said first direction.

Clutch controller 33 is connected between electrical angle detector 22 and clutches 35 and 37 to cause only one of said clutches to rotate its output shaft at any particular time and to generate a torque at the output shaft whose magnitude and sense depends upon the signal received from clutch controller 33.

Figure 4:
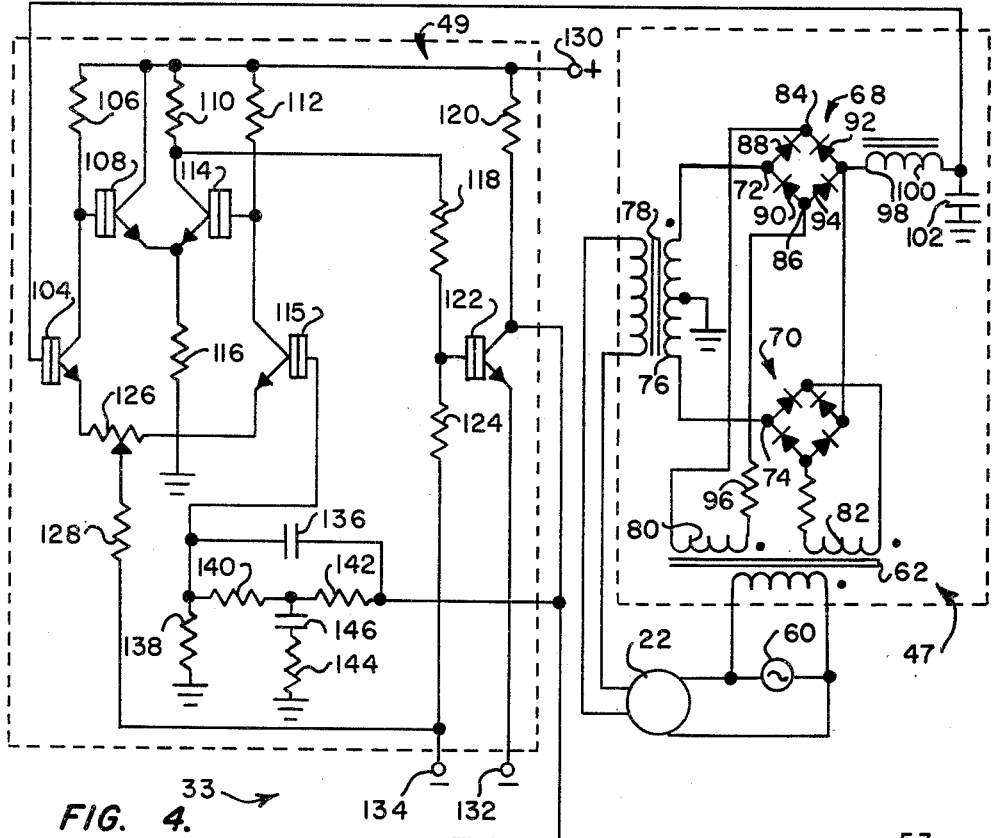
FIG. 4 is a schematic diagram of a typical circuit which is adapted to control a pair of slip-clutches which are positioned between a mechanical energy storing device and an output shaft.
Figure 4:
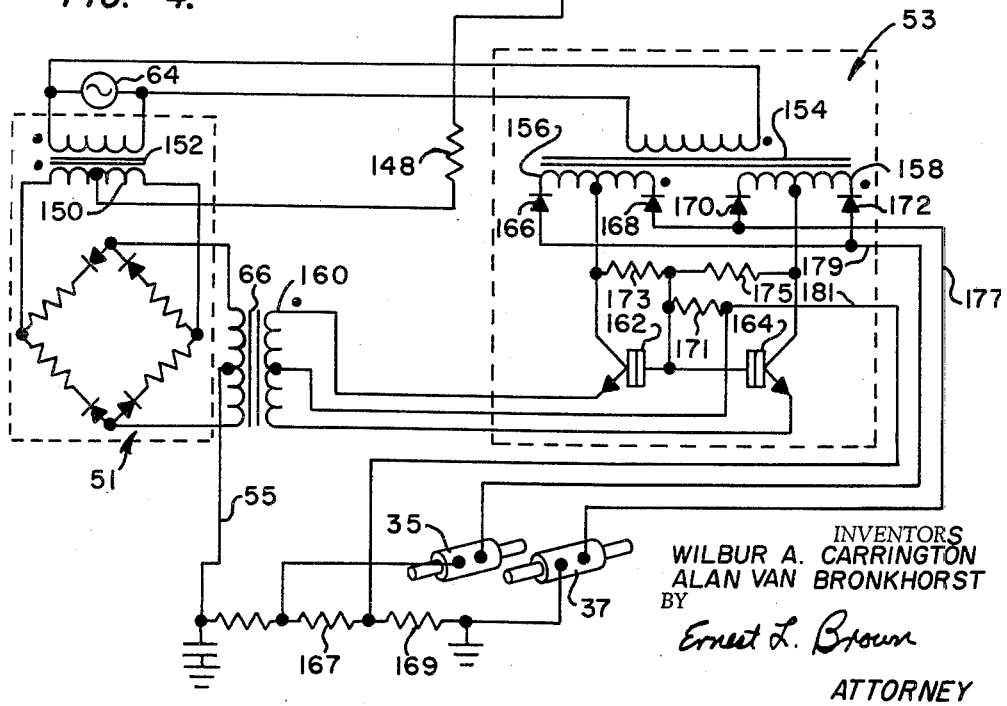

FIG. 4 shows a typical clutch controller 33. This particular clutch controller is intended to demonstrate only one of a number of possible clutch controllers. The particular clutch controller which is shown (by way of example only) in FIG. 4 is connected to be controlled by a pickoff or resolver 22 of the synchro type wherein the phase of the output voltage of resolver 22 depends upon the quadrant of the angle between gimbals 12 and 14 while the amplitude of the output voltage generated by synchro 22 is a function of the deviation from a right angle of the angle between gimbals 12 and 14. Synchro 22 is excited by a source of voltage 60 which is also connected through transformer 62 to a demodulator 47.

Demodulator 47 generates a constant voltage whose polarity depends upon the phase relation between the voltage of voltage source 60 and the voltage output of synchro 22. The amplitude of the direct voltage generated by demodulator 47 is proportional to the amplitude of the alternating output voltage from synchro 22.

The electrical output of demodulator 47 is connected to the input of transistorized feedback amplifier 49 with a lag circuit in the feedback network to cause amplifier 49 to generate an output which is a function of the input voltage and of the time derivative of the input voltage.

The electrical output of amplifier network 49 is connected to modulator 51. The particular modulator which is shown in FIG. 4 is known as a ring-bridge modulator. Construction and operation of modulator 51 is described on page 145 of "Transistor Circuit Engineering" (edited by R. F. Shea, third printing, copyright 1957 by John Wiley & Sons, Inc.)

The frequency of alternation of the electrical output of modulator 51 is the same as the frequency of alternation of voltage source 64. The output voltage of modulator 51 has an amplitude which is proportional to the magnitude of the input voltage and has a phase which depends on the polarity of the input voltage. The output of modulator 51 is connected through transformer 66 to the input of clutch actuating network 53.

Clutch actuating network 53 is connected to clutches 35 and 37 to selectively control clutches 35 and 37 in accordance with the amplitude of the voltage output of modulator 51 and with the relative phase between the voltage output of modulator 51 and the voltage of voltage source 64. In the particular circuit which is shown, a negative feedback lead 55 is connected to the input center tap of transformer 66 to stabilize the system. Whether this lead is required depends upon the particular transfer characteristics of clutches 35 and 37 as well as the servo transfer characteristics of the entire system.

Returning now to a detailed description of FIG. 4, first consider demodulator 47. Demodulator 47 is described briefly as a pair of ring-type phase-sensitive demodulators 68 and 70. Each demodulator is a half-wave demodulator which operates over one-half cycle of the voltage of voltage source 60. Each ring demodulator is identical. Demodulator 68 is connected to operate over one-half cycle of the voltage of voltage source 60 while demodulator 70 is adapted to operate over the other half cycle. Terminals 72 and 74 are connected to opposite ends of the output of center tapped winding 76 of transformer 78, the center tap of which is grounded and the primary of which is connected to the output of synchro 22. Ring demodulators 68 and 70 are in the form of a Wheatstone bridge. When the diodes of either demodulator are not firing, the arms of the bridge are open. When the diodes of one demodulator are fired or conducting, the Wheatstone bridge of that demodulator is balanced. Substantially no current is drawn from the circuit. Winding 80 of transformer 62 is connected across the input of demodulator 68 at terminals 84 and 86 to cause diodes 88, 90, 92, and 94 to conduct through resistor 96 when the dotted end of winding 80 is positive. Demodulator 68 acts then as a voltage dividing network in accordance with Wheatstone bridge principles to cause terminal 98 to have the same polarity and amplitude of voltage with respect to the ground terminal as appears at the terminal 72. A half-cycle later, ring demodulator 70 operates to cause demodulator 47 to be a full wave phase sensitive demodulator.

The full wave pulsed voltage which appears at terminal 98 is smoothed by means of a smoothing network of a choke coil 100 and a by-pass condenser 102. The electrical output then of full wave demodulator 47 depends upon the amplitude and phase of the output voltage of synchro 22. When the voltage of winding 76, in accordance with the usual dot convention, is in phase with the voltage of voltage source 60, the electrical output of demodulator 47 is positive. When the voltage of winding 76 is opposite in phase to the voltage of voltage source 60, the electrical output of demodulator 47 is negative.

The construction and operation of amplifier 49 is described generally in an article by Dean W. Slaughter which appears in the May 1955 issue of "Electronics" magazine at pages 174 and 175 entitled, "Feedback-Stabilized Transistor Amplifier." Feedback amplifier 49 utilizes five transistors and a feedback lag network.

In FIG. 4, a positive source of voltage (not shown) is connected to terminal 130 to place the proper operating potential on the base and collector of transistors 108, 114, 122, and on the collector of transistors 104, 115.

A negative potential source (not shown) is connected to terminal 134 to place the proper operating potential on the emitter of transistors 104, 115, and on the base of transistor 122.

A second negative potential source (usually of different magnitude, depending upon the characteristics of the respective transistor) is connected to terminal 132 and to the emitter of transistor 122.

Emitters of transistors 108 and 114 are connected through resistor 116 to the ground terminal, which is of a negative potential.

The collector of transistor 122 is connected through a filter network of resistors 138, 140, 142, 144 and condenser 146, and equalizing condenser 136 to the base of transistor 115.

The signal is now traced through amplifier 49. Consider (for example) that a positive signal is applied to the base of transistor 104. Assuming further that the emiter voltage of transistor 104 remains constant, the collector of transistor 104 then becomes negative which places a negative signal on the base of transistor 108. The negative signal on the base of transistor 108 causes a negative signal to appear at the emitter of transistors 108 and 114 inasmuch as the collector of transistor 108 is maintained at a constant potential. It is further assumed that the base of transistor 114 is maintained at a constant potential. A negative signal applied to the emitter of transistor 114 causes a negative signal to appear on the collector of transistor 114 which, in turn, is coupled through resistor 118 to the base of transistor 122. The emitter of transistor 122 is maintained at a constant potential so that a negative potential applied to the base of transistor 122 causes a positive potential to appear at the collector thereof. The collector of transistor 122 is the output terminal of amplifier 49.

A feedback loop is also connected between the output of the collector of transistor 122 and the base of transistor 115. Coupling condenser 136 acts as a neutralizing condenser to reduce stray oscillation in the circuit. The T network (of resistors 140 and 142 shunted by the series combination of condenser 146 and resistor 144) in parallel with resistor 138 is a frequency sensitive lag network, the values of the components of which are determined in accordance with the desired speed of response of the entire servo network. It is well known in the art that a lag network in the feedback branch of a feedback amplifier causes the feedback amplifier to act as if it has a lead network in series therewith.

The electrical output at the collector of transistor 122 is connected through resistor 148 to the center tap of the winding 150 of transformer 152. Winding 150 is connected through transformer 152 to voltage source 64. Ring-bridge modulator 51 then is biased by the direct current voltage applied to the center tap of winding 150. The electrical output of modulator 51 is an alternating voltage whose phase depends upon the polarity of the voltage applied to the center tap of winding 150.

Clutch controller 53 is adapted to channel current to either clutch 35 or clutch 37 in accordance with the relative phasing between the voltage of winding 160 and the voltage of alternator 64.

The voltage of alternator 64 is applied to windings 156 and 158 of transformer 154 with phasing in accordance with the usual dot convention. The center taps of windings 156 and 158 are connected to the collectors of transistors 162 and 164, respectively. The bases of transistors 162 and 164 are connected through resistor 171 to the center tap of winding 160 and through resistors 173 and 175 to the center taps of windings 156 and 158. The anodes of diodes 166, 168, 170 and 172 are connected to the ends of windings 156 and 158. The cathodes of diodes 166 and 172 are connected through conducting member 179 to clutch 35. The cathodes of diodes 168 and 170 are connected through conductor 177 to clutch 37. The return current path from clutch 35 is through resistor 167 and conductor 181 to the center tap of transformer winding 160. The return current path from clutch 37 is through resistor 169 and conductor 181 to the center tap of winding 160.

When the voltage of winding 160 is in phase with the voltage of windings 156 and 158, in accordance with the usual dot convention, the operation of clutch controller 53 is as follows. When the dot end of winding 160 is in the positive half-cycle, the current path to clutch 37 is from the emitter to the collector of transistor 162, through winding 156, through diode 168, through conductor 177 to clutch 37. The return path is through resistor 169 and conductor 181 to the center tap of winding 160. When the dot end of winding 160 is in the negative half-cycle, the current path to clutch 37 is from the emitter to the collector of transistor 164, through winding 158, through diode 170, through conductor 177 to clutch 37. The return path is through resistor 169 and conductor 181 to the center tap of winding 160.

When the voltage of winding 160 is opposite in phase to the voltage of windings 156 and 158, in accordance with the usual dot convention, the operation is as follows. When the dot end of winding 160 is positive, the current path to clutch 35 is from the emitter to the collector of transistor 162, through winding 156, through diode 166, through conductor 179 to clutch 35. The return current path is through resistor 167 and conductor 181 to the center tap of winding 160. During the half-cycle when the dot end of winding 160 is negative, the current path to clutch 35 is from the emitter to the collector of transistor 164, through winding 158, through diode 172, through conductor 179 to clutch 35. The return current path is through resistor 167 and conductor 181 to the center tap of winding 160.

It may thus be seen that when the voltage of winding 160 is in phase with the voltage of winding 156 and 158, that clutch 37 is energized and when the voltage of winding 160 is opposite in phase to the voltage of windings 156 and 158, clutch 35 is energized. Resistors 173, 175 and 171 are provided to cause a quiescent current to flow through clutches 35 and 37 when no signal is applied. The quiescent current which flows through clutches 35 and 37 causes equal and opposite torques to be applied to the output shaft of the servo system.

A typical magnetic particle clutch which is utilized in the preferred embodiment of this invention is shown in FIG. 5. In FIG. 5, shaft 200 is the output shaft of the clutch and shaft 202 is the input shaft. Clutch member 204 is adapted to rotate with shaft 200 while the remaining structure, including the outer case, is adapted to rotate with shaft 202. Bearings are connected therebetween and are shown more particularly at 206. Electrical coil 208 is wrapped around ferromagnetic spool 210 and receives current from slip rings 212 and 214. Electromagnetic flux is generated in the path shown by arrow 216. Ferromagnetic particles are positioned within gaps 218 and 220 adapted to form chains to frictionally drive clutch member 204 to thereby transfer torque from shaft 202 to shaft 200 when coil 208 is energized.

The operation of the device of this invention under conditions wherein the supporting vehicle is an airframe and inertial device 10 is a stabilized platform now follows.

In FIG. 1, the device of this invention is shown with a supporting aircraft in level flight. It is to be noted that roll axis 8 of reference device 10 and roll axis 17 of the supporting aircraft now coincide. When the supporting aircraft 20 rolls about axis 17, some friction is carried across bearings 21 and 24 to cause gimbal 14 to move away from a right angle relative to gimbal 12. Assume for the moment that the supporting aircraft rolls in the direction shown by arrow 1. Friction tends to move gimbal 14 in the same direction about axis 8 as that followed by aircraft 20 about axis 1. However, reference device 10 remains horizontal. Any attempt by gimbal 16 to roll with airframe 20 must be resisted by unwinding gimbal 16 thereby to keep the plane of gimbal 14 at right angles to the plane of gimbal 12. Any misalignment from a right angle between the plane of gimbal 14 and the plane of gimbal 12 causes synchro 22 to generate a signal which energizes either clutch 35 or clutch 37 depending upon the direction of inclination of gimbal 12 relative to gimbal 14. The signal amplitude delivered to clutches 35 or 37 depends upon the angular deviation of the plane of gimbals 12 and 14 from a right angle. A continuous servoing of the gimbal 16 occurs. Gimbal 16 receives its energy from flywheel 28 to keep the planes of gimbals 12 and 14 normal to each other.

Figure 2:
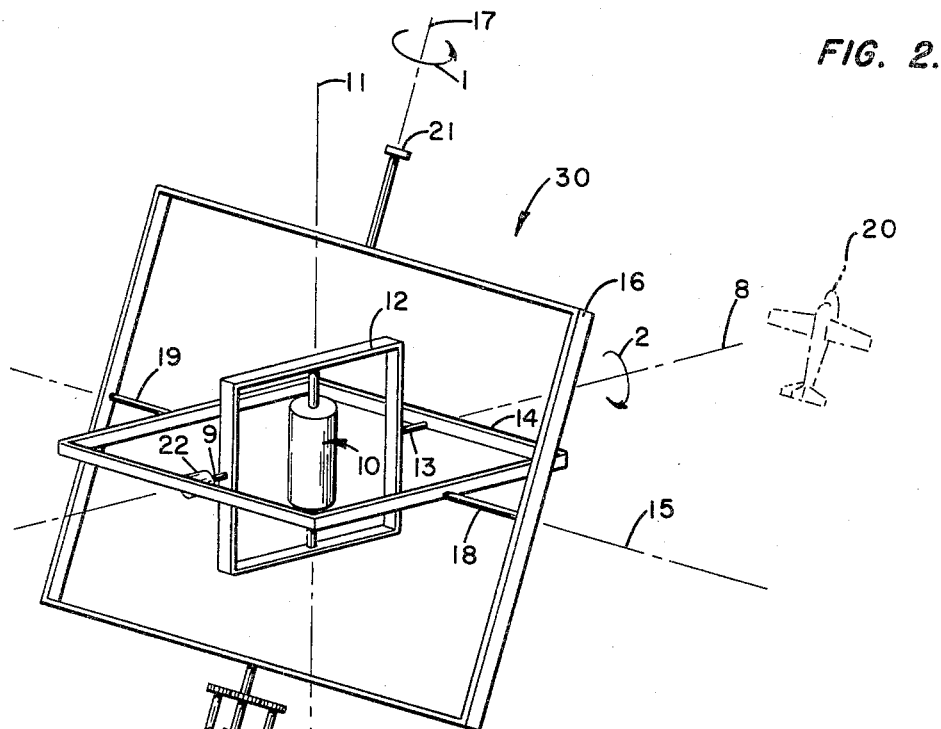
FIG. 2 is a diagram of an inertial reference device supported by a structure which is inclined 60° above the horizontal.

In FIG. 2, the supporting aircraft has pitched upward to an angle of the order of 60° about pitch axis 15 and carries the gimbal 16 with it. While the supporting aircraft is climbing, if it should roll about axis 17, as shown by arrow 1, reference device 10 maintains its stability and does not roll. However, rolling of the aircraft about axis 17 causes motion of gimbal 16 about axis 8 (as shown by arrow 2) which moves gimbal 14 away from a right angle relative to gimbal 12. A signal is received from synchro 22 which controls clutches 35 and 37 (shown in FIG. 1) to transfer energy from flywheel 28 thereby to unroll gimbal 16 in a direction contrary to that of arrow 1.

Figure 3:
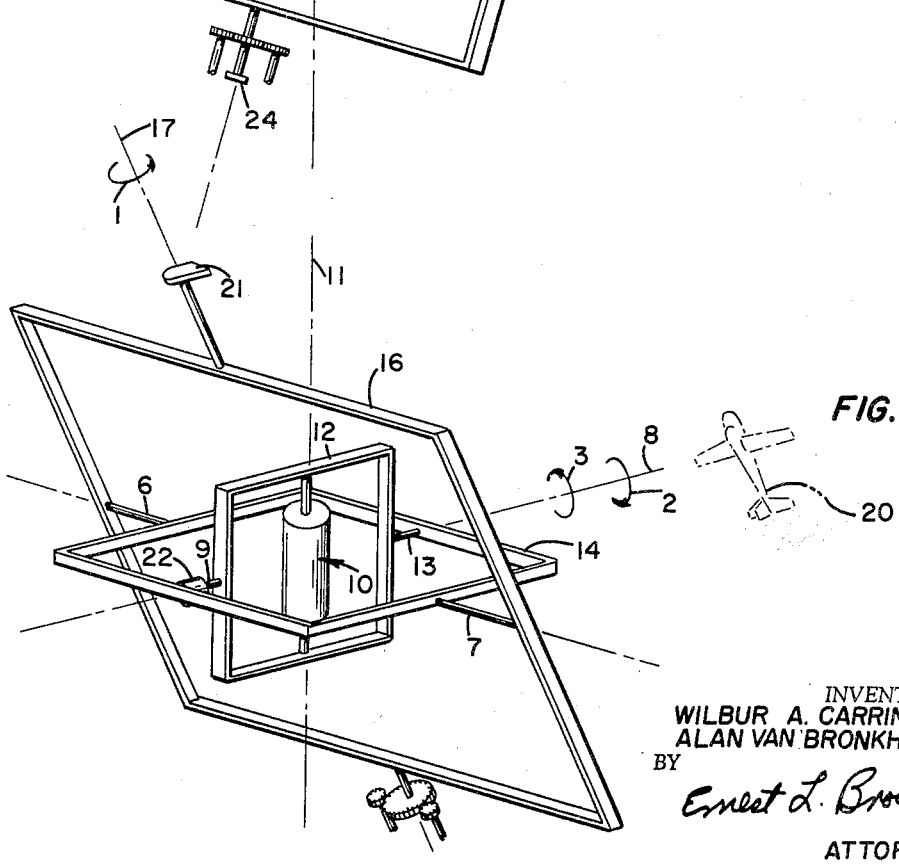
FIG. 3 is a diagram of an inertial reference device with the axis of the redundant gimbal rotated through approximately 120°.

As the supporting aircraft passes through a vertical climb and pitches over onto its back (as shown in FIG. 3), a slight roll of the aircraft in the direction of arrow 1 (and it is to be noted that the direction of arrow 1 relative to the aircraft has not changed from FIG. 2 to FIG. 3) causes gimbal 16 to misalign gimbal 14 relative to gimbal 12 to generate a signal in synchro 22 which should cause gimbal 16 to unwind. However, notice that a roll of the aircraft in the direction of arrow 1 in FIG. 2 causes gimbal 14 to move in the direction of arrow 2 about axis 8. After the aircraft has climbed through the vertical position (as in FIG. 3), however, a roll about axis 17 in the direction of arrow 1 by the aircraft causes gimbal 14 to go in the direction of arrow 3 rather than arrow 2.

Since synchro 22 is continuously sensing errors due to roll of the aircraft, as the aircraft passes through the vertical position, a 180° error signal is registered by synchro 22 which causes gimbal 16 to slew rapidly 180° about axes 11 and 17 in a very short period of time. Gimbal 16 would actually appear to flip as the aircraft went through its vertical.

With a typical gimbal system in which the device of this invention is frequently utilized, the inertia load is of the order of 80 pound-inches-squared, the maximum velocity of gimbal 16 is required to be of the order of 12 radians-per-second, the maximum acceleration of gimbal 16 is of the order of 300 radians-per-second-squared with a maximum required torque on gimbal 16 of the order of 60 inch-pounds. It is understood that these figures are by way of example only and are not limiting on this invention.

In conventional servos, such requirements require heavy motors and amplifiers and prohibitive gear ratios. For example, in a conventional servo for the load described above, an 80 to 1 gear ratio is not uncommon, the power consumption required for slewing gimbal 16 is of the order of 200 watts and the weight of the motor and amplifier together with the gear train is approximately 50 pounds.

In the device of this invention, the backlash is substantially zero, the average power consumption from the source which drives flywheel 28 is of the order of 16 watts for the load described above, and the weight of the motor and amplifier is approximately 6 pounds.

It may thus be seen that considerable benefit is achieved when the device is to be used on a precision instrument and carried in an aircraft where instantaneous power requirements of high magnitude and heavy weight equipment are prohibitive.

The device of this invention then is a novel servo system which is adapted to rapidly slew devices such as gimbals, gun mounts, and like devices which require high surges of instantaneous power.

The device of this invention has a relatively small average power requirement, small instantaneous source-power requirement, and is light in weight.

Although the device of this invention has been described particularly in connection with a roll gimbal in a servo system which is adapted to drive a roll follow up or redundant gimbal in an aircraft, it is not intended that the device should be limited to such a use nor should it be limited by the above description which describes a specific embodiment, but only in accordance with the following claims.

We claim:

1. In combination: a gimbal mounted for rotation upon bearings; a gyroscope supported by said gimbal, means for storing energy in mechanical form; and magnetic particle slip clutch means, connected between said energy storing means and said gimbal to selectively apply a torque with a given value and sense to said gimbal.

2. In combination: a gimbal mounted upon bearings for rotation; a gyroscope supported by said gimbal, flywheel means for storing mechanical energy; and slip clutch means connected between said means for storing energy and said gimbal adapted to selectively apply a controlled torque to cause said gimbal to rotate in a controlled direction with a controlled angular acceleration.

3. A device as recited in claim 2 in which said clutch means comprises: a pair of magnetic particle slip-clutches in torque opposition, connected to said gimbal by means of their output and having a common input connected to said flywheel means; means for selectively operating only one of said clutches at any particular time, the torque transmitted from said flywheel means to said gimbal being dependent in sense and magnitude upon the signal applied to said clutch means.

4. In combination: a gimbal system including a redundant gimbal to prevent gimbal lock; a follow-up servo adapted to drive said redundant gimbal to prevent gimbal lock, said servo comprising mechanical energy storing means adapted to store mechanical energy, and clutch means connected between said mechanical energy storing means and said redundant gimbal to selectively cause said redundant gimbal to rotate in a controlled manner in a controlled direction.

5. A device as recited in claim 4 in which said mechanical energy storing means is a rotating mechanical member.

6. A device as recited in claim 4 in which said mechanical energy storing means is a mechanically rotating member and said clutch means comprises a pair of slip clutches having one end engaging said rotating member and their other end mechanically opposing each other and attached to said redundant gimbal to cause said gimbal to rotate.

7. In combination a gimbal system including at least one gimbal, a gyroscope supported by said gimbal system, servo means adapted to drive one of the gimbals in said gimbal system, said servo comprising mechanical energy storing means adapted to store mechanical energy, and clutch means connected between said mechanical energy storing means and said one gimbal to selectively cause said one gimbal to rotate in a controlled manner and in a controlled direction.

References Cited in the file of this patent

UNITED STATES PATENTS

| | | |
|---|---|---|
| Re. 23,692 | Vickers | Aug. 4, 1953 |
| 1,236,993 | Sperry et al. | Aug. 14, 1917 |
| 2,386,402 | Lilja | Oct. 9, 1945 |
| 2,468,137 | Tear | Apr. 26, 1949 |
| 2,590,029 | Minorsky | Mar. 18, 1952 |
| 2,758,484 | Keltner | Aug. 14, 1956 |
| 2,802,364 | Gievers | Aug. 13, 1957 |
| 2,820,872 | Carr | Jan. 21, 1958 |
| 2,846,889 | Ten Bosch et al. | Aug. 12, 1958 |